US007927535B2

(12) United States Patent
Cetnar

(10) Patent No.: US 7,927,535 B2
(45) Date of Patent: Apr. 19, 2011

(54) SUPPORTING ASSEMBLY FOR A LOCK OF A MOTOR VEHICLE, AND METHOD FOR FABRICATION OF SAID ASSEMBLY

(75) Inventor: Roman Cetnar, Newmarket (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 1182 days.

(21) Appl. No.: 10/517,954

(22) PCT Filed: Jun. 13, 2003

(86) PCT No.: PCT/IT03/00370

§ 371 (c)(1), (2), (4) Date: Jun. 17, 2005

(87) PCT Pub. No.: WO03/106790

PCT Pub. Date: Dec. 24, 2003

(65) Prior Publication Data

US 2005/0241133 A1 Nov. 3, 2005

(30) Foreign Application Priority Data

Jun. 14, 2002 (IT) .............................. TO2002A0511

(51) Int. Cl.
*B29C 69/00* (2006.01)

(52) U.S. Cl. ........................................................ 264/255

(58) Field of Classification Search .................. 264/255; 29/527.1, 527.2; 292/337
See application file for complete search history.

(56) References Cited

U.S. PATENT DOCUMENTS 5,505,506 A 4/1996 Kleefeldt
5,582,449 A 12/1996 Weyerstall
5,855,130 A 1/1999 Rorabacher et al.

FOREIGN PATENT DOCUMENTS

EP 0 940 241 9/1999
EP 1 030 014 8/2000
GB 1498024 1/1978

*Primary Examiner* — Christina Johnson
*Assistant Examiner* — Larry Thrower
(74) *Attorney, Agent, or Firm* — Clark Hill PLC

(57) ABSTRACT

A supporting assembly for a lock of a motor vehicle having a shell made of plastic material, which defines a housing for a part of the mobile members of the lock and with at least one metal element, which supports respective pins for hinging the aforesaid mobile members. The shell, which is made of plastic material, is co-molded on the metal element.

1 Claim, 5 Drawing Sheets

SUPPORTING ASSEMBLY FOR A LOCK OF A MOTOR VEHICLE, AND METHOD FOR FABRICATION OF SAID ASSEMBLY

TECHNICAL FIELD

The present invention relates to a method for fabricating a supporting assembly for a lock of a motor vehicle.

BACKGROUND ART

As is known, a closing system for a door of a motor vehicle comprises a lock mounted on the door and a lock striker mounted in a fixed portion of the bodywork in the proximity of the opening of the door itself (or, more rarely, vice versa).

The lock basically comprises a closing mechanism designed to couple, in a releasable way, with the lock striker so as to obtain a relative blocking between the lock and the lock striker itself when the door is closed, and a lever-type actuating assembly, which can be connected to the manual-control elements associated to the door, such as, for instance, the internal and external handles, and which is designed to interact with the closing mechanism to control opening thereof.

The closing mechanism and the actuating assembly are normally mounted on a supporting assembly, which is, in turn, designed for being rigidly fixed to the corresponding door of the motor vehicle.

In particular, the supporting assembly defines a U-shaped seat for receiving the lock striker so as to enable its coupling to the closing mechanism and is formed by a metal frame and a shell made of plastic material, which are coupled together.

Supporting assemblies for locks of motor vehicles are known, in which the metal frame is made up of a pair of plates, which are fixed, on opposite sides, on the shell made of plastic material and which delimit with the latter a housing compartment for the closing mechanism. One of the plates is fixed, for example by means of screws, to the door, and, together with the other plate, supports a plurality of transverse pins for hinging the levers that form the closing mechanism and the actuating assembly. More precisely, the aforesaid pins are normally riveted, at their opposite ends, to the plates of the metal frame.

The supporting assemblies described above, albeit proving functionally valid, require the management of a relatively large number of components, which must be made to converge onto one and the same assembly line for being assembled together with one another and with the various levers of the closing mechanism and of the actuating assembly.

Furthermore, the greater the number of components that are to be assembled, the longer the overall duration of the assembly operations and the greater the deviation between the design dimensional values of the assembly to be made and the effective dimensional values of the assembly obtained, the said effective dimensional values suffering from inevitable play due to assembly between the components themselves.

DISCLOSURE OF INVENTION

The purpose of the present invention is to provide a method for fabricating a supporting assembly for a lock of a motor vehicle, which will enable the drawbacks linked to known supporting assemblies, as specified above, to be overcome.

According to the present invention, a method for fabricating a supporting assembly for a lock of a motor vehicle is provided, according to claim 1.

BRIEF DESCRIPTION OF THE DRAWINGS

For a better understanding of the present invention, there now follows a description of a preferred embodiment, provided purely by way of non-limiting example, and with reference to the attached drawings, in which.

BEST MODE FOR CARRYING OUT THE INVENTION

Figure 1:
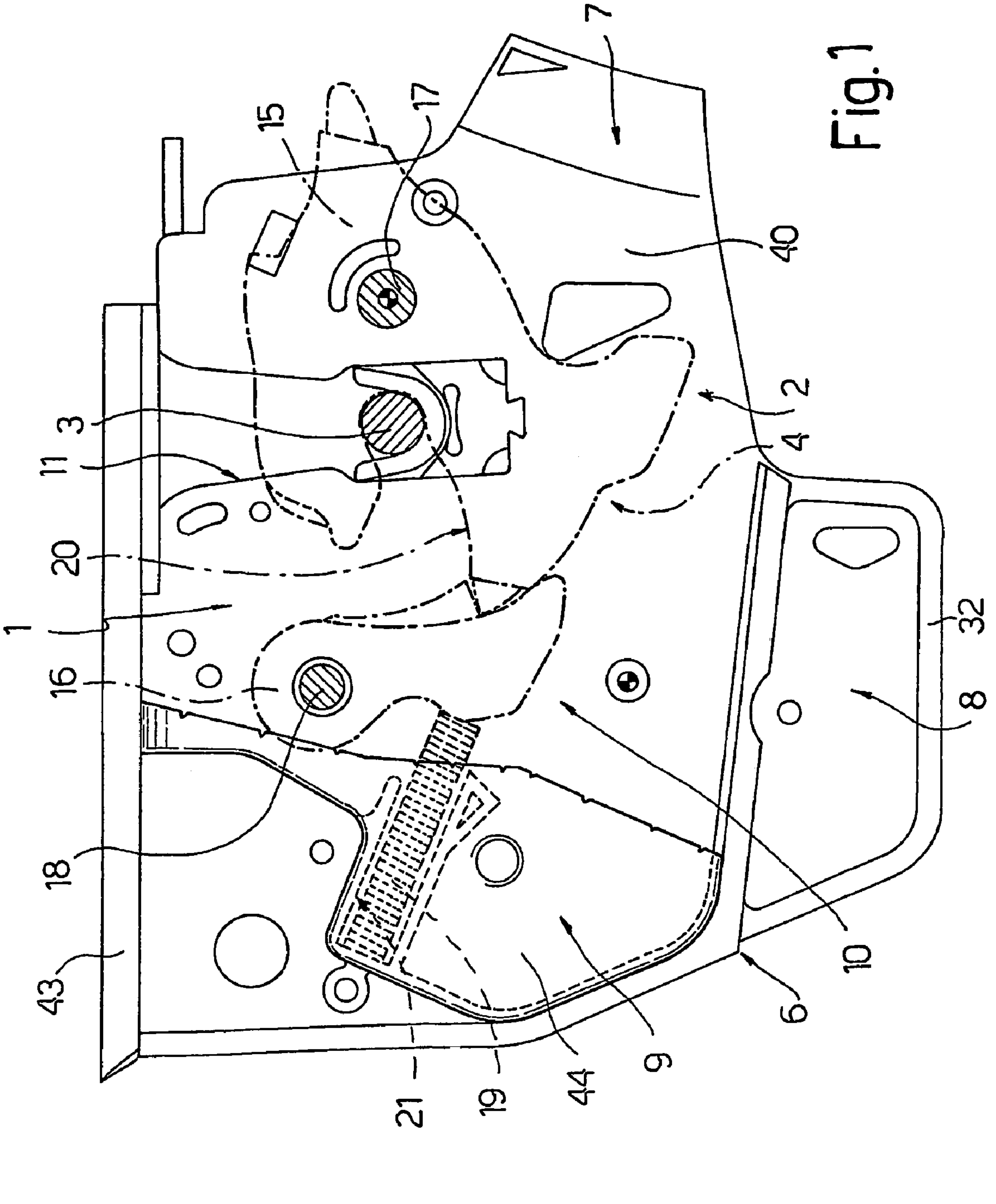
FIGS. 1 and 2 are views, from opposite sides and with parts removed for reasons of clarity, of a lock for a motor vehicle, which comprises a supporting assembly built according to the method of the present invention.
Figure 2:
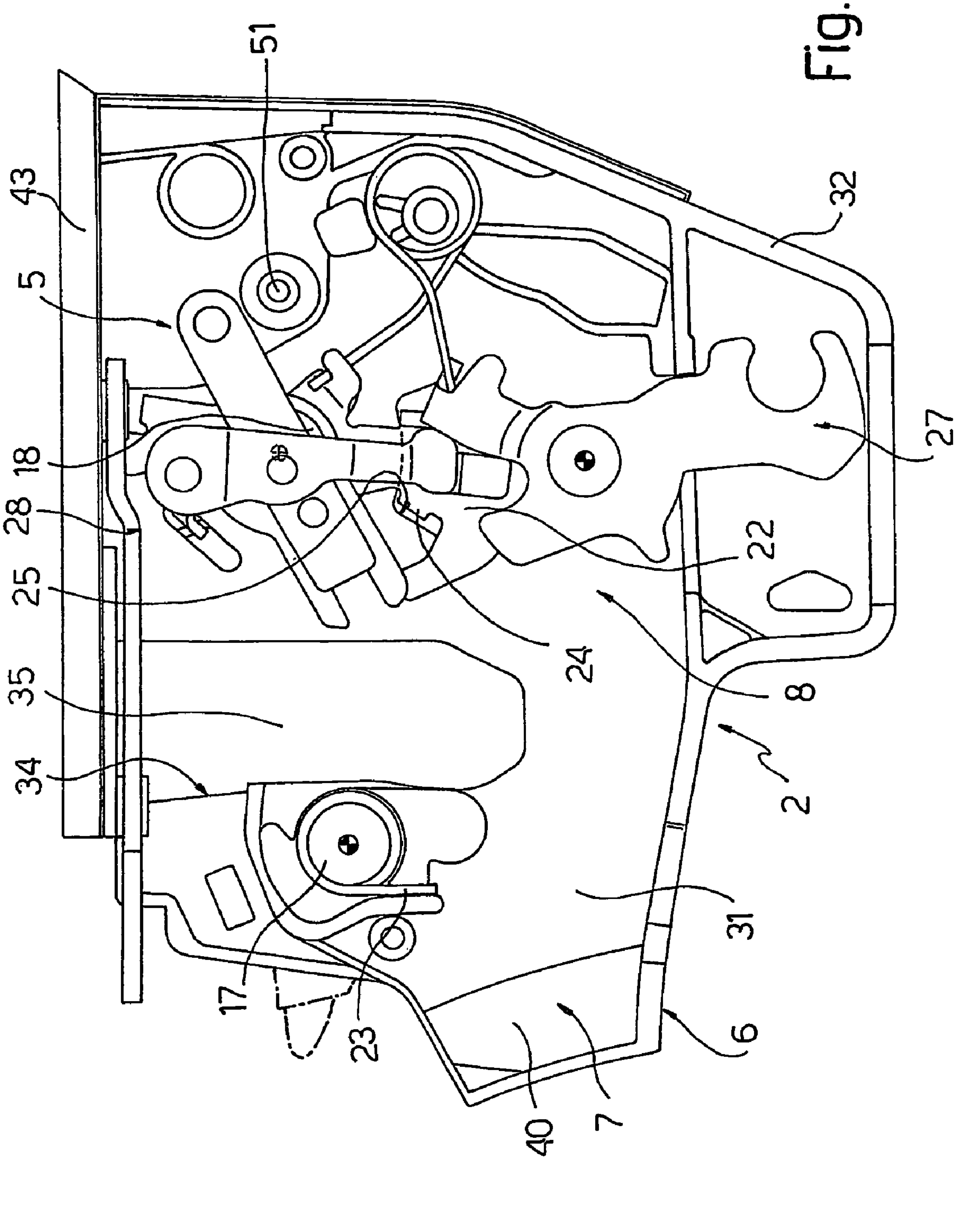

With reference to FIGS. 1 and 2, the number 1 designates, as a whole, a closing system for a door (not illustrated) of a motor vehicle (not illustrated either).

The closing system 1 comprises, in a known way, a lock 2 and a lock striker 3, which are designed to be mounted, respectively, on the door and on a fixed portion of the bodywork in the proximity of the opening of the door (or more rarely vice versa) and to interact with one another to provide closing of the door.

The lock 2 basically comprises a closing system 4 (indicated by a dashed and dotted line in FIG. 1), which is designed to couple, in a releasable way, with the lock striker 3 in order to bring about closing of the door, and an actuating assembly 5, of a mechanical type (FIG. 2), which can be connected to manual-control elements associated to the door of the vehicle, such as, for instance, the internal and external handles (not illustrated), and which is designed to interact with the closing mechanism 4 for controlling release thereof from the lock striker 3.

The closing mechanism 4 and the actuating assembly 5 are mounted on a single supporting assembly 6, which is designed for being rigidly fixed to the door of the motor vehicle.

In particular, the supporting assembly 6 has a sandwich structure and is made up of an intermediate shell 7, which is made of plastic material and has a flattened conformation, and a pair of metal plates 8, 9 fixed, on opposite sides, on the shell 7.

As may be seen in particular in FIG. 1, the shell 7 and the plates 8, 9 delimit between them a cavity 10 for housing the closing mechanism 4; the actuating assembly 5 (FIG. 2) is, instead, set outside of the cavity 10 on the side where one 8 of the plates 8, 9 is located.

In order to enable introduction of the lock striker 3 inside the cavity 10 of the supporting assembly 6 so that it can interact with the closing mechanism 4, the shell 7 and the plates 8 and 9 delimit a seat 11 for receiving the lock striker 3, the said seat being open outwards.

It is to be pointed out that the closing mechanism 4 and the actuating assembly 5 will be described hereinafter only as far as is necessary for the understanding of the present invention.

In particular, the closing mechanism 4 (FIG. 1) comprises, in a known way, a fork 15 and a dog or catch 16 hinged about respective pins 17, 18, which are rigidly fixed to the plates 8, 9 and extend through the shell 7 in a direction orthogonal to the portions of the plates 8, 9 that support them.

The fork 15 is made up of a shaped plate hinged, in an area corresponding to a first intermediate portion, to the pin 17 and has a C-shaped peripheral seat 20 designed to receive the lock striker 3.

The fork 15 is pushed, in a known way, by a cylindrical helical spring 23 (FIG. 2), which is wound around the pin 17 in the direction of an opening position (not illustrated), in which it enables engagement and disengagement of the lock striker 3 within/from its own seat 20.

Under the thrust of the lock striker 3 and following upon slamming of the door, the fork 15 rotates about the axis of the pin 17 from the opening position to a closing position (FIG. 1), in which it blocks the lock striker 3 in its own seat 20.

The dog 16 is formed by a shaped metal plate, which extends on the same plane of lie as the fork 15 and at one side of the latter. The dog 16 is designed for snap-action coupling with the fork 15 so as to block the fork 15, in a releasable way, in the closing position.

The dog 16 is pushed, in a known way, in the direction of the fork 15 by a cylindrical helical spring 19, which acts against one side of the dog 16 opposite to the side that co-operates with the fork 15 and is housed in a corresponding seat 21 of the shell 7.

The actuating assembly 5 (FIG. 2) comprises an opening lever 22 hinged to a portion of the pin 18, which projects in cantilever fashion from the plate 8 towards the outside of the cavity 10 and has a projection 24, which is slidably engaged through respective slots 25, 26 of the plate 8 and the shell 7 and is designed to interact with the dog 16 to control its decoupling from the fork 15.

The actuating assembly 5 further comprises a pair of actuating mechanisms 27, 28, which can be connected, in a known way, respectively to an external handle and an internal handle of the door (the said handles not being illustrated) and which co-operate selectively, in a way not described herein, with the opening lever 22 in order to bring about, by means of displacement of the dog 16, opening of the lock 1 from outside and, respectively, from inside the motor vehicle.

According to an important feature of the present invention, the shell 7, which is made of plastic material, is co-moulded directly on the metal plate 8. The element thus obtained is subsequently fixed to the plate 9 by means of riveting of the pins 17, 18.

Figure 5:
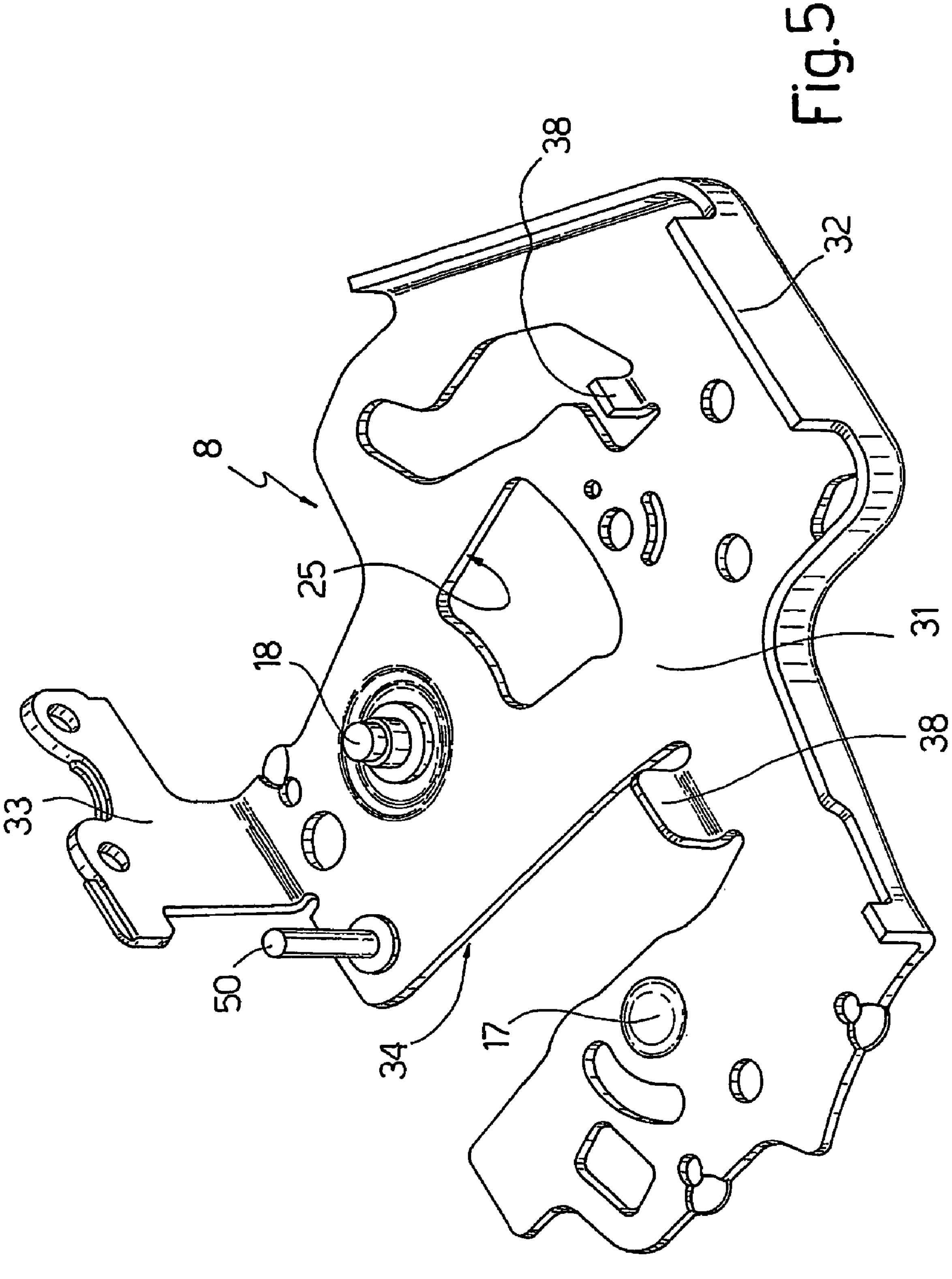
FIG. 5 is a perspective view of a metal plate, starting from which there is made the component of FIG. 4 using the method that forms a subject of the present invention.

With particular reference to FIG. 5, the plate 8 comprises a plane main portion 31 having, on one side, a peripheral edge 32 in relief and, on the opposite side, an end appendage 33, which extends on a plane orthogonal to the plane of lie of the main portion 31.

The plate 8 has a substantially U-shaped opening 34, which is open towards the edge of the plate 8, from which there extends the appendage 33, and is engaged, as will be explained in greater detail in what follows, by a box-shaped protuberance 35 of the shell 7, which delimits the seat 11 for receiving the lock striker 3.

At the opposite sides of the opening 34, the plate 8 is provided with respective through holes for engagement of the respective pins 17, 18.

The plate 8 defines a plurality of additional openings and slots, amongst which the slot 25 for engagement of the projection 24 of the opening lever 22, the said openings and slots being designed to receive respective portions of the shell 7 or of components of the actuating assembly 5.

Finally, the plate 8 has a pair of projections 38, which extend in cantilever fashion from the main portion 31 and are designed to remain englobed in corresponding portions of the shell 7 following upon the co-moulding operation. For instance, one of the projections 38 extends orthogonally in cantilever fashion from a bottom edge of the opening 34 and, at the end of the co-moulding operation, adheres externally to the protuberance 35 of the shell 7.

Figure 3:
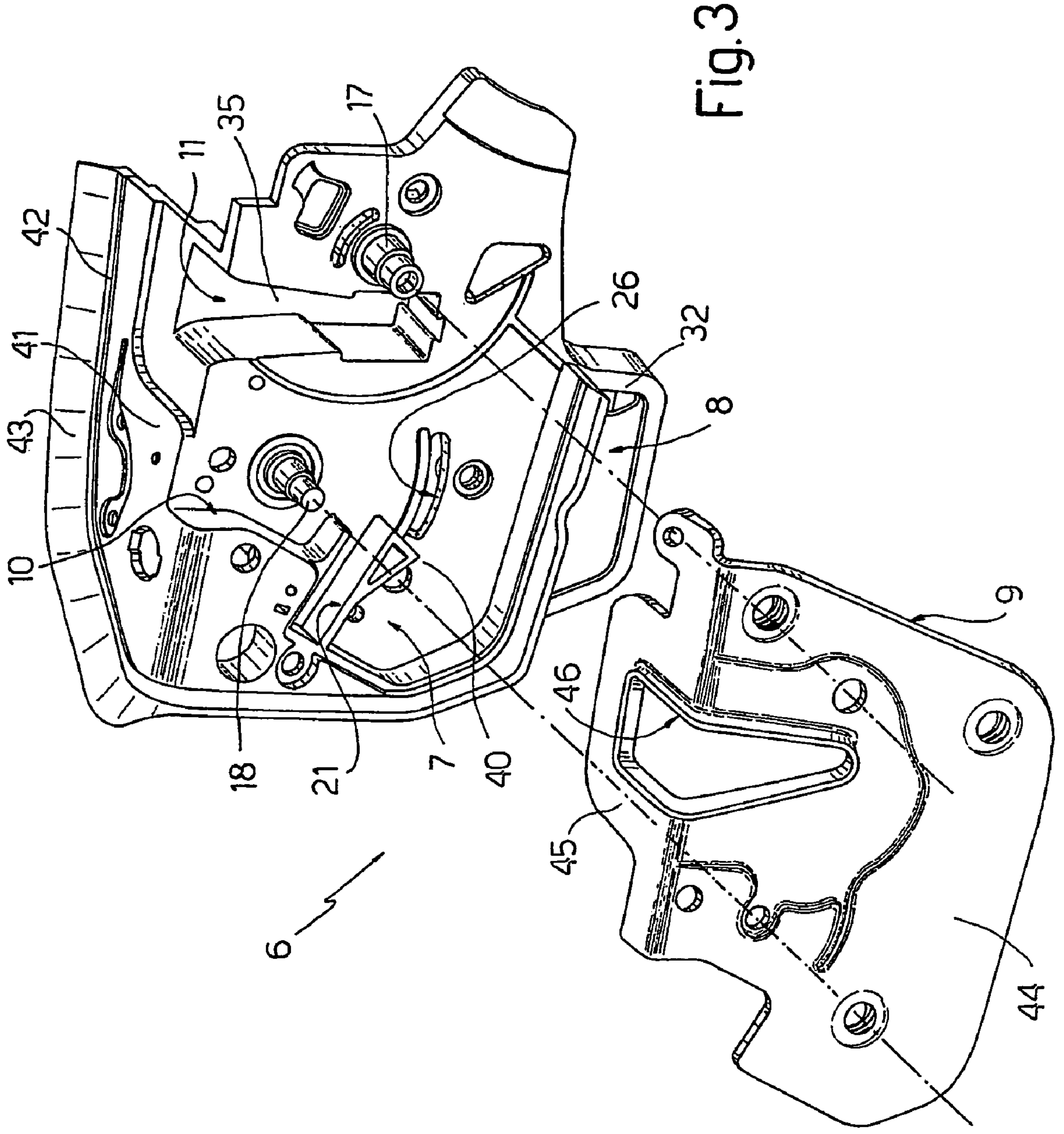
FIG. 3 is an exploded perspective view, at an enlarged scale, of the supporting assembly illustrated in FIG. 1.
Figure 4:
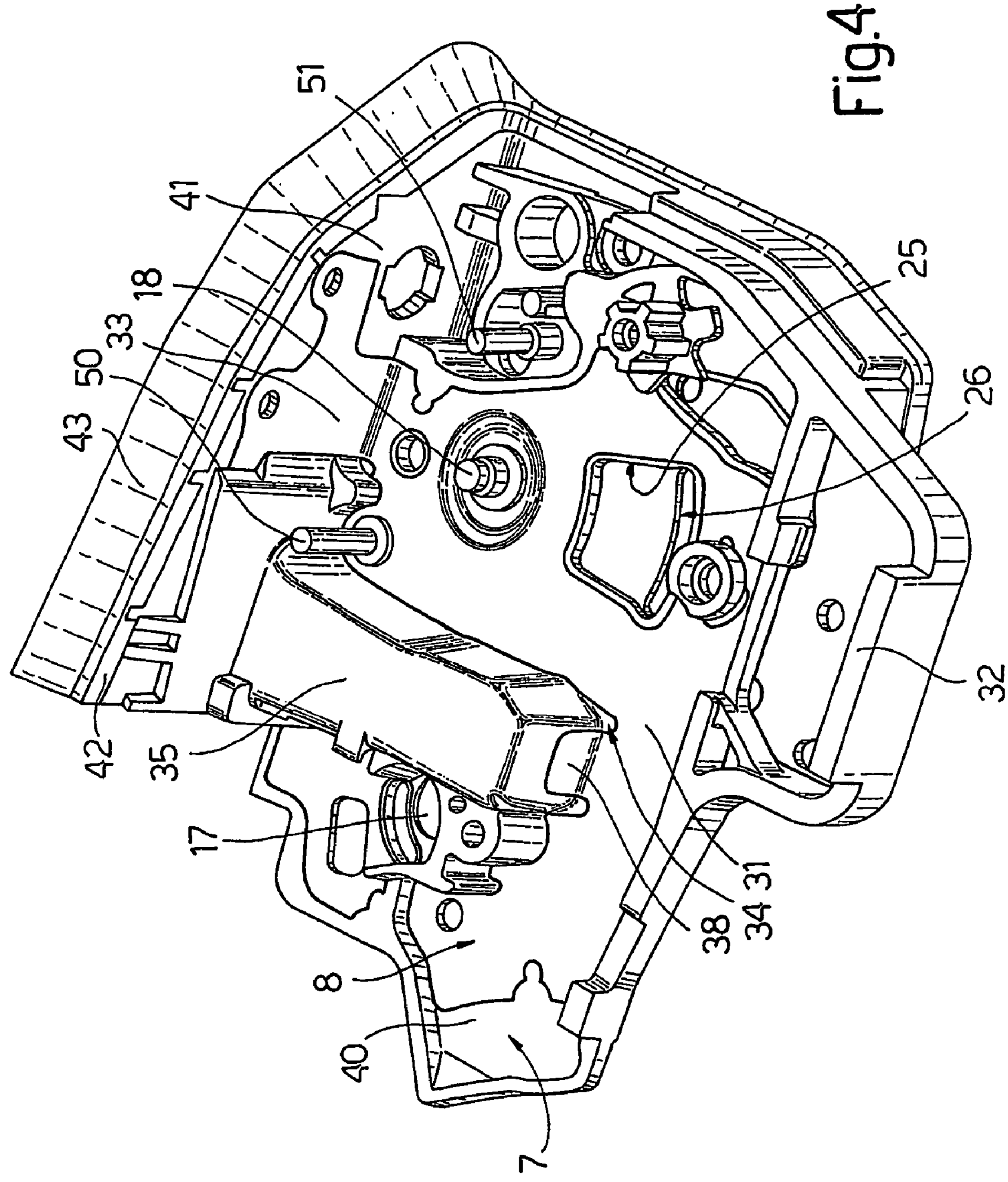
FIG. 4 is a perspective view, at an enlarged scale, of a component of the supporting assembly illustrated in FIG. 1.

With particular reference to FIGS. 3 and 4, the shell 7 is substantially L-shaped and is basically made up of two portions 40, 41, which are set at right angles and are fixed by means of co-moulding respectively to the main portion 31 and to the appendage 33 of the plate 8.

The portion 40 has a flattened prismatic conformation, delimits, in the direction of the plate 9, the cavity 10 for housing the closing mechanism, and generates, together with the portion 41, the protuberance 35 for delimiting the seat 11 for receiving the lock striker 3.

In particular, the protuberance 35 extends, in cantilever fashion, from the portion 40 of the shell 7 on the side where the plate 8 is located, makes contact, at one end, with the portion 41 of the shell 7 and is open, both in the direction of the plate 9, so as to communicate with the cavity 10, and in an area corresponding to the portion 41 of the shell 7, in order to enable entry of the lock striker 3 inside it.

The portion 41, instead, has a plate-like conformation and carries, on one of its own free ends 42, a co-moulded gasket 43.

Like the shell 7, the plate 9 (FIG. 3) is made up of two portions 44, 45 set at right angles with respect to one another and fixed on the respective portions 40, 41 of the shell 7 on the opposite side of the main portion 31 and of the appendage 33 of the plate 8.

The plate 9 has an opening 46, which presents a closed elongated profile, which extends on both of the portions 44, 45 and is set in a position corresponding to the seat 11 delimited by the protuberance 35 of the shell 7.

The supporting assembly 6 of the lock 2 is obtained using the method described in what follows, starting from the plate 8, on which there are preliminarily riveted the pins 17, 18 and a further pin 50 of the actuating assembly 5 (see FIG. 5).

In particular, the pin 17 extends in cantilever fashion from the main portion 31 of the plate 8 in a direction opposite to the appendage 33; the pin 50 of the actuating assembly 5 projects from the same side on which the appendage 33 is located; and the pin 18 extends from both sides of the main portion 31.

The plate 8 provided with pins 17, 18 and 50 is then inserted in a die (not illustrated) in such a way as to define the base on which the shell 7 is co-moulded. During this operation, a pin 51 of the actuating assembly 5, which remains englobed in the shell 7, is inserted in the die.

Before extracting the element thus obtained from the die, an operation of co-moulding of the gasket 43 on the edge 42 of the portion 41 of the shell 7 is performed.

The supporting assembly 6 can then be completed with fixing of the plate 9 on the shell 7 on the side opposite to where the plate 8 is located. This operation is obviously carried out after mounting the closing mechanism 4 around the shell 7.

From an examination of the characteristics of the supporting assembly 6 obtained according to the present invention, the advantages that the said invention makes possible are evident.

In particular, thanks to the co-moulding of the shell 7 on the plate 8, it is possible to reduce the number of components of the supporting assembly 6, and hence of the lock 2, that need to be handled and made to converge on one and the same assembly line in order to be assembled together.

The above advantage leads to a significant reduction in the duration of the operations for assembling the lock 2, as well as a greater correspondence between the design dimensional values of the supporting assembly 6 and the dimensional values that can be achieved once assembly has been carried out. In fact, the operation of co-moulding the shell 7 on the plate 8 enables the inevitable play of fit between the aforesaid elements to be eliminated.

Finally, it is clear that modifications and variations can be made to the supporting assembly 6 described and illustrated herein, without thereby departing from the sphere of protection of the present invention.

The invention claimed is:

1. A method for fabricating a supporting assembly for a lock and actuating assembly of a motor vehicle, the lock comprising a plurality of mobile members hinged to corresponding lock pins, the actuating assembly having a plurality of actuating members hinged to an actuating pin for operating the lock, and the supporting assembly comprising a shell made of plastic material defining a housing for at least one of the mobile members of the lock and a first metal plate supporting the lock pins, the method comprising the steps of:

placing the first metal plate into a mold die;

inserting the actuating pin into the mold die, wherein the actuating pin is separate and spaced from the first metal plate;

molding the shell to the first metal plate in the mold die and around the actuating pin to englobe the actuating pin in the shell;

molding a seal gasket around the peripheral edge of the shell in the mold die;

removing the first metal plate and co-molded shell from the mold die;

assembling the mobile members to the lock pins and the actuating members to the actuating pin housed within the shell; and placing a second metal plate against the seal gasket to close the housing formed by the shell between the first and second metal plates.

* * * * *